United States Patent
Carter et al.

(10) Patent No.: US 9,654,339 B1
(45) Date of Patent: *May 16, 2017

(54) METHOD AND SYSTEM FOR PROVISIONING SPECIFICATION SUBSETS FOR STANDARDS-BASED COMMUNICATION NETWORK DEVICES

(71) Applicant: ARRIS Enterprises, Inc., Suwanee, GA (US)

(72) Inventors: Wade E. Carter, Suwanee, GA (US);
Michael Sullivan, Sugar Hill, GA (US);
Chris Turner, Buford, GA (US);
Robert Eng, Alpharetta, GA (US);
Bruce McClelland, Suwanee, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,717

(22) Filed: Aug. 21, 2014

Related U.S. Application Data

(63) Continuation of application No. 10/706,421, filed on Nov. 12, 2003, now Pat. No. 8,886,808.

(51) Int. Cl.
| | |
|---|---|
| *H04L 12/24* | (2006.01) |
| *H04N 21/426* | (2011.01) |
| *H04N 7/173* | (2011.01) |
| *H04L 12/28* | (2006.01) |
| *H04L 29/06* | (2006.01) |

(Continued)

(52) U.S. Cl.
CPC ...... *H04L 41/0803* (2013.01); *H04L 12/2801* (2013.01); *H04L 29/06027* (2013.01); *H04N 7/17309* (2013.01); *H04N 21/42676* (2013.01); *H04N 21/4788* (2013.01);

(Continued)

(58) Field of Classification Search
USPC .......................................... 709/220, 223, 227
See application file for complete search history.

(56) References Cited

U.S. PATENT DOCUMENTS

| | | | | | |
|---|---|---|---|---|---|
| 4,788,657 | A | * | 11/1988 | Douglas | H04M 11/066 379/242 |
| 6,467,088 | B1 | * | 10/2002 | alSafadi | G06F 8/65 713/100 |

(Continued)

*Primary Examiner* — Backhean Tiv
(74) *Attorney, Agent, or Firm* — Bart A. Perkins

(57) ABSTRACT

A communication protocol specification is divided into subsets of parameters based on patterns established by equipment vendors. A combination of subsets is selected based on parameters and features supported by particular network devices installed in a network. A user interface facilitates convenient creation or modification of a configuration file, which instructs a network device how to format a communication message and what information is to be contained therein.

After the configuration file is loaded into a device, it controls software switches in the device such that features and parameters corresponding to the parameters selected with the user interface and controlled by the switches are either enabled or disable based on the parameters selected. Supported parameter combinations for popular equipment may be prestored so that selection with the interface of a particular piece of equipment automatically edits the configuration file according to the features and parameters supported by said equipment.

17 Claims, 3 Drawing Sheets

(51) Int. Cl.
  *H04N 21/61* (2011.01)
  *H04N 21/643* (2011.01)
  *H04N 21/6547* (2011.01)
  *H04N 21/4788* (2011.01)

(52) U.S. Cl.
  CPC ..... *H04N 21/6118* (2013.01); *H04N 21/6168* (2013.01); *H04N 21/64322* (2013.01); *H04N 21/6547* (2013.01)

(56) References Cited

U.S. PATENT DOCUMENTS

| | | | | |
|---|---|---|---|---|
| 6,493,751 B1 * | 12/2002 | Tate | H04L 41/0843 | 370/254 |
| 6,499,062 B1 * | 12/2002 | Shteyn | G06F 9/4443 | 700/19 |
| 6,598,057 B1 * | 7/2003 | Synnestvedt | H04L 29/06 | |
| 6,614,799 B1 * | 9/2003 | Gummalla | H04L 12/2801 | 348/E7.07 |
| 6,772,205 B1 * | 8/2004 | Lavian | H04L 41/0213 | 370/254 |
| 6,816,500 B1 * | 11/2004 | Mannette | H04L 47/24 | 370/337 |
| 6,904,592 B1 * | 6/2005 | Johnson | G06F 8/65 | 705/52 |
| 7,058,559 B1 * | 6/2006 | Roeck | H04L 41/145 | 375/222 |
| 7,088,720 B1 * | 8/2006 | Schneider | H04L 12/5601 | 370/352 |
| 7,739,359 B1 * | 6/2010 | Millet | H04L 12/2861 | 709/220 |
| 8,886,808 B2 * | 11/2014 | Carter | H04L 12/2801 | 709/227 |
| 2002/0001100 A1 * | 1/2002 | Kawanabe | G06K 15/00 | 358/1.15 |
| 2003/0074430 A1 * | 4/2003 | Gieseke | H04L 41/0213 | 709/221 |
| 2003/0100297 A1 * | 5/2003 | Riordan | G06F 8/60 | 455/418 |
| 2004/0001479 A1 * | 1/2004 | Pounds | H04L 12/66 | 370/352 |
| 2004/0153778 A1 * | 8/2004 | Cheng | G06F 9/44505 | 714/25 |
| 2004/0233926 A1 * | 11/2004 | Cummings | H04L 12/2801 | 370/437 |
| 2005/0078609 A1 * | 4/2005 | Sharma | H04L 12/2801 | 370/254 |
| 2005/0078688 A1 * | 4/2005 | Sharma | H04L 12/2801 | 370/401 |
| 2005/0223374 A1 * | 10/2005 | Wishart | G06F 11/1417 | 717/173 |
| 2006/0262722 A1 * | 11/2006 | Chapman | H04N 21/242 | 370/229 |

* cited by examiner

METHOD AND SYSTEM FOR PROVISIONING SPECIFICATION SUBSETS FOR STANDARDS-BASED COMMUNICATION NETWORK DEVICES

CROSS REFERENCE TO RELATED APPLICATION

This application claims priority and benefit as a continuation of U.S. application Ser. No. 10/706,421, filed on Nov. 12, 2003, which claims priority under 35 U.S.C. 119 to U.S. application Ser. No. 60/425,922, filed 12 Nov. 2002, each of which is incorporated herein by reference in its entirety.

FIELD OF THE INVENTION

The present invention relates generally to providing telephony over Internet protocol, and, more particularly, to facilitating the configuration of interfacing features and capabilities of a cable modem with other network devices.

BACKGROUND

As the use of digital data for transporting communication signals continues to grow in the consumer sector, more and more homes and offices are beginning to receive telephony services using an Internet connection. Furthermore, the physical network that transports the data may comprise a community antenna television ("CATV") coaxial cable ("coax") network. In such a scenario, a drop from a service provider's outdoor coaxial cable plant connects to subscriber premise equipment ("SPE"), which is sometimes located outside a home or small office, or inside the premises. Within the SPE, television video signals and data signals, such as for example, Internet signals, are broken out and routed to their corresponding equipment. A cable modem is an example of an SPE with a coaxial cable connection for interfacing with a CATV network and typically an Ethernet or USB connection for transporting a data signal. To the cable modem, a media terminal adapter ("MTA") is typically connected if a customer receives telephony services via the data signal. In addition, some manufacturers house the cable modem and MTA as a single device, for example, a Touch-stone™ Telephony Modem product ("TTM"), as offered by ARRIS International, Inc. Such an arrangement is typically referred to in the art as an embedded MTA ("EMTA").

A TTM, for example, provides a user with telephony services over an Internet Protocol ("IP") data network, which may utilize a cable modem termination system ("CMTS"). Cable telephony generally, the technology related to which is known in the art, provides a subscriber with telephony service that is transparent as to the source of the service. In other words, a user plugs a telephone into a TTM and can access a set of features such as, for example, dial tone, call waiting and other features similar to those provided by a traditional plain old telephone system ("POTS"), typically implemented using the public switched telephone network ("PSTN").

To provide telephony, a cable modem typically interfaces with a CMTS and other network system equipment, such as, for example, PacketCable provisioning servers, media gateways and PacketCable call management servers. Since voice over IP is still a developing technology, many vendors have not fully implemented the full set of PacketCable features, which are specified within the protocols for communicating among various network devices that implement voice over IP using the existing CATV infrastructure. To avoid communication errors between devices that support different feature sets, technicians typically customize the software embedded into a cable modem, or other network devices, so that the device for which the software is being customized can provide data in a format that other devices to which it will be communicating understand and support.

For example, if a cable modem manufactured by vendor A is to be used in a service provider's network having a CMTS manufactured by vendor B, and vendor B has not implemented all of the features and specifications of PacketCable, then engineers and technicians for vendor A may have to customize the software for the cable modem. This would facilitate recognition of modem data by the CMTS. This would also facilitate recognition of CMTS data by the modem. The customization may include translating the data sent from one format to another, or where certain features are not implemented by one device, but are by the other, conditioning the data so that it is either eliminated from the data packets sent, or nulled to merely comprise a place holder so that the remaining data bits that are sent will be received in the expected sequence.

Since there are many vendors of devices that implement the PacketCable specification, with each potentially implementing different parts or features of the specification, the customizing process increases the cost because engineers and technicians must analyze the interface requirements of each combination of network devices that are to communicate with one another and modify the embedded software accordingly for a given installation combination. Thus, the device operating software is typically loaded into a network device at the factory before shipment to the end user, either a consumer, with respect to cable modems, or service providers, with respect to CMTS and another head end devices. Although the software can also be loaded remotely into a device after it has been placed in use in a network, this still requires that engineers and technicians analyze the device requirements and capabilities, customize the software at the source code level for a particular combination of devices and download the software to the device.

Therefore, there is a need in the art for a method and system providing for the convenient and inexpensive configuration of communication interface features so that cable modems and other network devices implementing the PacketCable specification can communicate with other PacketCable devices.

SUMMARY

A method and system provide for the convenient and inexpensive configuration of PacketCable network devices to facilitate communication with other PacketCable network devices. The entire PacketCable specification parameters are divided into predetermined subsets, as it has been discovered that certain vendors, relative to a particular piece of equipment having a particular level of functionality, implement certain PacketCable features and do not implement others. The features that are or are not implemented by a given vendor generally fall into definable subsets. By categorizing the features into defined subsets, operating software of a device can be configured to enable or disable the features of an entire subset or group. Thus, instead of having to modify the software at the source code level for a particular installation, a technician can enable or disable a given subset, or group, of features by provisioning device's operating software to turn on or off a software 'switch' or 'switches.'

For example, a vendor A cable modem is to be used in a network controlled by a vendor B CMTS, where vendor B does not use the features that are categorized into a particular subset. The software in the cable modem can be easily provisioned or configured to set a software switch or switches to disable the subset of features not implemented in the vendor B CMTS. Thus, an engineer need not write special code at the source code level to work around the non-support of these features by the remote server, or other piece of equipment.

In addition to the ability to set a software switch or switches, a user interface provides graphical user interface software for easily editing the operating system software to turn on or off the selected switches before the software is loaded into one or more cable modems, for example. Thus, a technician may use a personal computer to edit software parameters before they are loaded into a network device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
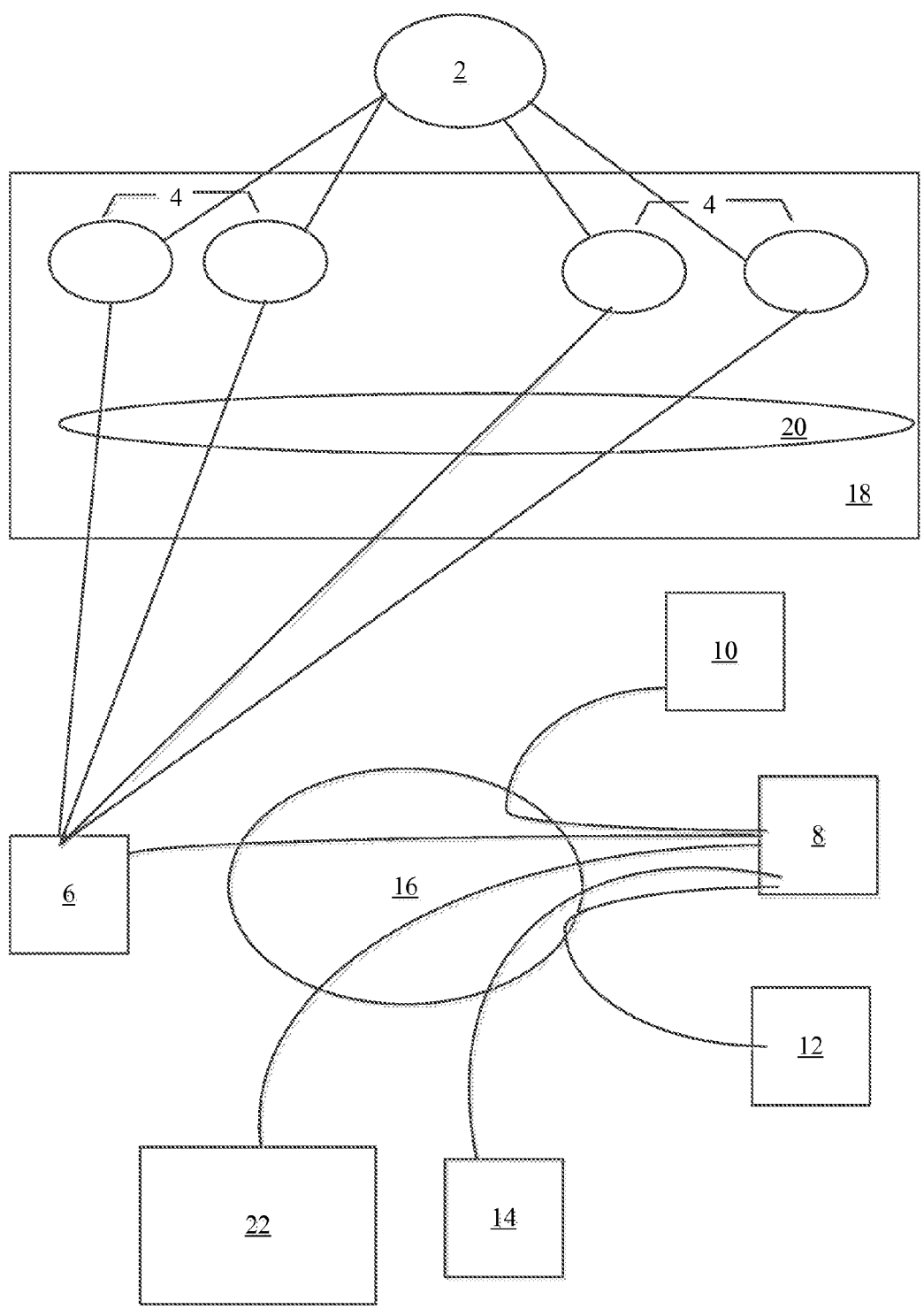
FIG. 1 illustrates PacketCable specification grouped into subsets of the entire specification with the capability to enable or disable any combination of subsets.

Turning now to the figures, FIG. 1 illustrates that the PacketCable specification 2 may be divided into subsets 4A-n. Through trial and error, it has been discovered that certain features of the specification 2 tend to be grouped together by equipment vendors with respect to what their equipment does and does not support and implement. This equipment may include an embedded MTA within cable modem 6, the term cable modem herein after being used to refer to the EMTA portion of the cable modem, a CMTS 8, a provisioning server 10, a media gateway 12 and a call management server 14, among others. These components are known to those skilled in the art, so their function with respect to voice over IP will not be discussed further. These components are typically connected over a hybrid fiber coaxial network, also known in the art. In addition, other networking infrastructure technologies may be used to connect voice over IP devices together, including, but not limited to, coaxial cable, fiber optic, twisted pair, or wireless.

The PacketCable specification seeks to standardize the protocols for connecting and providing telephone calls over an IP network using the Data Over Cable Service Interface Specification DOCSIS standard. However, as discussed above, all equipment that purports to be PacketCable-compatible does not necessarily implement all of the PacketCable-specification feature set. Thus, in order for a PacketCable device to communicate with another PacketCable device, each device must know what to expect when sending and/or receiving a data packet to/from the other device. Otherwise, the receiving device may become confused as to what the data is, since it is typically in binary format, and perform erratically, or not at all, if the data structure of a received packet does not comport with what it expects.

Thus, when the operating software 18 is loaded into a cable modem for example—the same would apply for other PacketCable devices as well—, certain of the groups, or subsets 4, of specification 2 can be configured to be enabled or disabled before operating software 18 is loaded. This may be accomplished by selecting certain subsets 4 in software 18 to enable or disable software switches 20 inside modem 6 that turn on or off certain predetermined subsets comprising typically type length value ("TLV") variables. When software 18 has been loaded and is operational, and the cable modem sends out a packet, only data corresponding to what the CMTS, or other network device, expects is transmitted. Therefore, if subset 4C relates to emergency, or 911, calling, for example, and call management server 14 does not support emergency calling, then parameters relating to emergency calling will not be provisioned into the software load 18 of cable modem 6 and software switch 20C corresponding to the emergency calling parameters will be turned off, as shown in the figure. Accordingly, a packet received by CMTS 8 and passed to management server 14 will only contain the information that the management server expects to receive and not parameters related to emergency calling. Computer 22 is used to select parameter subsets and enter values there for.

Figure 2:
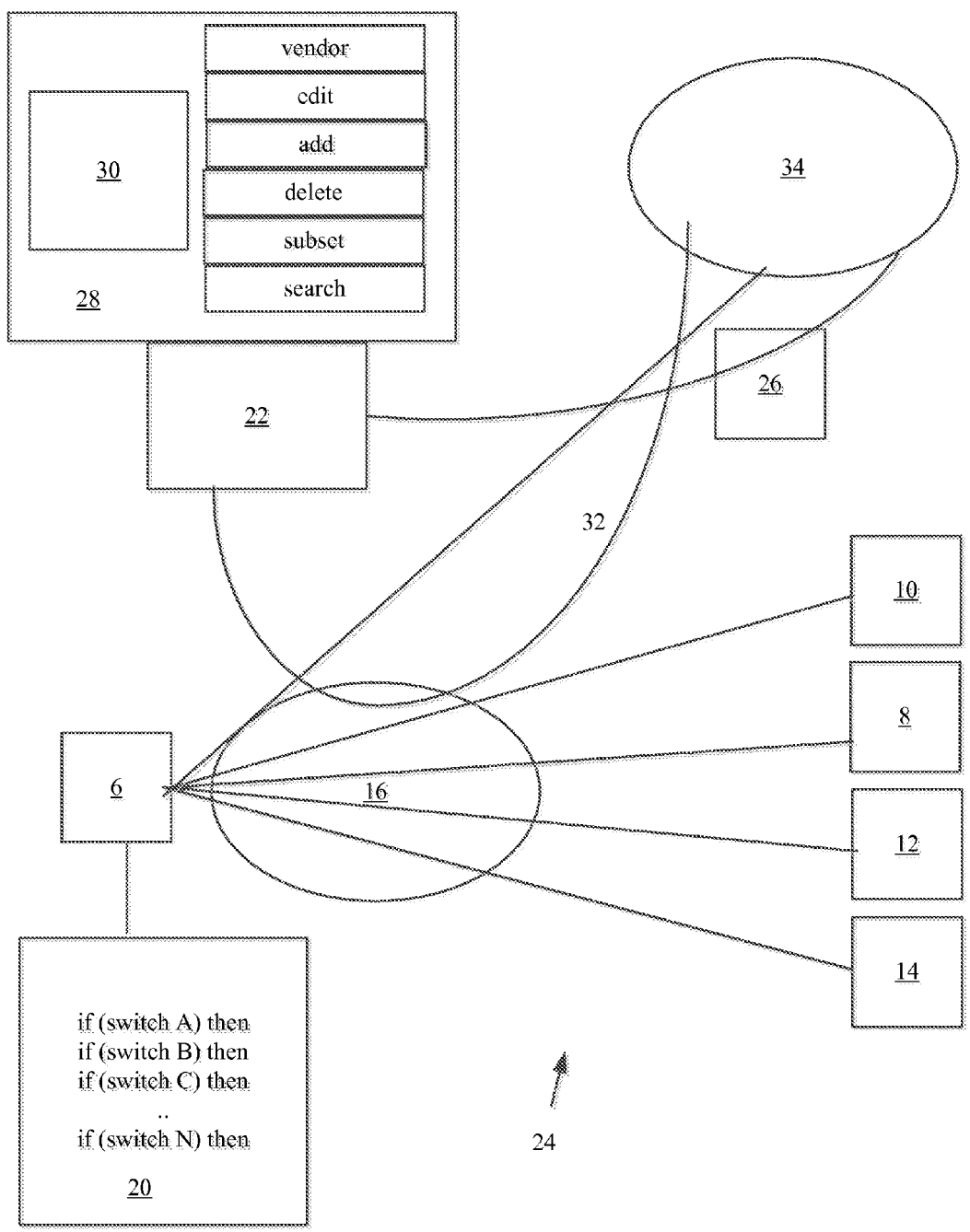
FIG. 2 illustrates a system and flow diagram for enabling certain specification subsets.

Turning now to FIG. 2, a system 24 is shown for selecting and updating the operating system software for cable modem 6, having an EMTA. It will be appreciated that the same system can be used to select, enter and load software parameters for other networks devices as well, including, but not limited to, provisioning server 10, CMTS 8, media gateway 12 and call manager server 14. Process steps are shown with encircled numerals in the figure, and will be used to sequentially describe the method and system for implementing the loading and operation of cable modem's 6 software 18.

At step 1, a user, typically a engineer or technician working for a service provider, such as, for example, a cable television company, creates or edits a configuration file 26 using user interface 28, which may be a software based editor application running on PC 22. Based on the vendor of a given piece of equipment to which the cable modem 6 must communicate, the technician may select the vendor and type of the equipment. Based on this input, the editor software may have prestored groupings of parameter subsets corresponding to the selected equipment that are displayed in parameters pane 30. If the prestored parameter information needs to be updated, the technician may edit the displayed parameters and values thereof, using any of the control items shown on the right side of the interface. The technician may also use typical PC commands, such as cut, paste, overwrite and insert, for example, to edit the parameters directly in pane 30. Computer 22 may be located anywhere there is a network connection to CMTS 8 as shown by dashed line 32, but this will typically be at the service provider head end or the administrative office.

When the configuration file 26 has been properly created/edited, it is transferred at step 2 to server 34. Server 34 is typically located at the head end and is typically a trivial file transfer protocol server ("TFTP"). From server 34, configuration file 26 is sent to cable modem 6, or other network device being configured, at step 3. When file 26 is received at modem 6, the values of the variables within selected parameter subsets are used to set software switches 20 inside the modem at step 4. These software switches 20 are typically implemented in the EMTA portion of modem 6, but may be implemented in a separate MTA device that is separate from the DOCSIS modem circuitry.

Switches 20 typically correspond to each of the plurality of parameter variables that exist in the PacketCable specification. Thus, in the figure, switch 20A, for example, controls a group, or subset, of parameter variables, and thus represents a software means for switching on or off more than one parameter. However, a subset is represented by one switch for clarity and to show that certain parameters tend to be associated with others, so that for ease of setting up and editing of configuration file 26, one subset can be selected to simultaneously enable or disable all parameter variables in the given subset. However, it will be appreciated that if the parameters that a particular vendor's equipment recognizes do not match exactly with those in the prestored groupings, or subsets, the technician can override the prestored groupings and enable or disable individual parameter variables within the groupings represented by switches 20, by using editor 28 before storing the selected information to file 26.

When file 26 has been received and switches 20 are configured (turned on or off) to correspond to file 26, modem 6 configures its interface with the other network devices based on the switch settings, so that when packets are sent from the modem to the other devices—the modem typically communicates directly with CMTS 8, but indirectly through the CMTS with the other devices—the packets contain information in a format that is recognizable by the receiving device, and thus communication errors are avoided. Moreover, when a software 'switch' 20 is off, certain pieces of information, which may be entire packets of data, associated with the switch are not sent, for instance, from cable modem 6 to a particular server or other piece of equipment. For example, if a piece of equipment to which modem 6 will be communicating only supports single MAC functionality, at startup, the modem would not send DNS requests, AS, TGS and AP requests. In addition, modem 6 would not conduct SNMP messaging related to requesting and receiving MTA device capabilities and various file transfer aspects. Other features that are turned off are related to TFTP server addressing and sending of telephony provisioning information.

Figure 3:
FIG. 3 illustrates a user interface displayed on a personal computer for specifying communication parameter values.

These features are known in the art and are given as examples of features that make up a particular subset related to single MAC functionality. The suppression of these requests and messaging related to certain features, which are grouped together as a subset, is controlled by variables that are included in the configuration file 26. The requests and other information sent from modem 6 are typically contained in separate packets, although more than one may be contained in the same packet. Thus, if the configuration file 26 instructs modem 6 that the equipment with which it will be communicating at startup only supports single MAC functionality, the modem will suppress, or 'switch off', the sending of packets containing data for setting up these features between the modem and the remote piece or piece or pieces of equipment Turning now to FIG. 3, the preferred embodiment of the configuration editor user interface 28 is shown. Pane 30 shows variables for which values are used to control communication between network devices. For example, subset variable 36, 'arrisCmDevProvMethodIndicator.0', which corresponds to the provisioning method to be used, can be set to one of several different values 38. In the figure, value 38 is set to 'singleMAC', which corresponds to the example given above in reference to FIG. 2. Using interface 28 to edit configuration file 26, when value 38 shown in FIG. 3 is set to 'singleMAC', the subset of parameters discussed above relating to single MAC functionality is indicated. When cable modem 6 referenced in FIG. 2 starts up with the configuration file set as such, software switches in the modem will be set to suppress the sending of packet data related to the non-supported features as indicated by value 38. Other subsets that may be indicated by entering different values 38 into variable 36 include no suppression of features, which would indicate that the entire PacketCable specification is to be used. In addition, value 38 can be set to suppress features related to lack of support of KDC or to support GUPI functionality. These subsets, or groupings, of parameters to suppress sending of certain protocol information represent common patterns based on current equipment being sold by various vendors. However, it will be appreciated that as more equipment is produced and offered for sale, other groupings of parameters into subsets can be made available to accommodate future products.

Similarly, when variable 40 is set to one of several different values 42, features that can be enabled/disabled include, but are not limited to, NCS message piggybacking, lockstep mode for the endpoint, transmission of wildcard NCS messages, RFC2833 messaging support, DSx-QoS or full PacketCable DQoS, provisional responses, multiple connections per line for supporting 3WC and CWT functionality, media encryption support, and support for NCS error codes 404 and 540 for interoperation with call management servers. These features are part of the entire PacketCable specification and are known to those skilled in the art. As shown in FIG. 3, value 42 is a numerical field, but those skilled in the art will appreciate that any form of variable or value can be used to convey configuration information from the configuration file to the device being configured.

When a given configuration file has been edited using editor 28, upon saving the configuration file using standard computer interface functions, such as, for example, selecting from a drop down menu 'save' or 'save as', computer 22 saves the file to server 34 in a format that is recognizable by the device being configured, as described above in reference to FIG. 2.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

We claim:

1. A system for configuring a customer equipment in a communication network, comprising:
   an operating software load embedded in a machine-readable media of the customer equipment;

the operating software load comprising switch settings each controlling a predetermined group of device settings for compatible operation between the customer equipment and equipment of the communication network, wherein the predetermined group of device settings are associated with one or more features;

each switch of the switch settings turning the predetermined group of device settings on or off based on whether the one or more features associated with the predetermined group of devices are compatible with the equipment of the communication network, each of the predetermined group of device settings comprising a plurality of settings which either are or are not implemented by a particular type of the equipment of the communication network;

a configuration server device to adapt a configuration file with settings for the switches of the operating software load of the customer equipment; and the operating software load adapted to apply the settings for the switches of the operating software load of the customer equipment to set the each switch of the switch settings on or off.

2. The system of claim 1 wherein the switch settings of the operating software load control groups of type length values that determine content of messages between the customer equipment and the equipment of the communication network.

3. The system of claim 1 wherein the customer equipment comprises logic configured to provision the customer equipment responsive to at least one of the settings for the switches of the operating software load of the customer equipment.

4. The system of claim 1, wherein the configuration server device comprises a trivial file transfer protocol server.

5. The system of claim 1, wherein the customer equipment comprises an embedded media terminal adapter.

6. The system of claim 1, wherein the configuration server device comprises a packetCable provisioning server.

7. The system of claim 1, wherein the configuration server device comprises a packetCable call management server.

8. A cable modem configured to operate over a machine communication network, the cable modem comprising:

a machine-readable media comprising an operating software load;

the operating software load adapted with switch settings each controlling a predetermined group of device settings for compatible operation between the cable modem and equipment of the communication network, wherein the predetermined group of device settings are associated with one or more features;

each switch of the switch settings turning a predetermined group of settings of the cable modem on or off based on whether the one or more features associated with the predetermined group of devices are compatible with the equipment of the communication network, each of the predetermined group of settings of the cable modem comprising a plurality of settings which either are or are not implemented by a particular type of the equipment of the communication network;

a communication interface to the machine communication network adapted to receive a configuration file with settings for the switch settings of the operating software load; and the operating software load adapted to apply the settings for the switch settings of the operating software load to set the each switch of the switch settings on or off.

9. The cable modem of claim 8 wherein the switch settings of the operating software load control groups of type length values that determine content of messages between the cable modem and the equipment of the communication network.

10. The cable modem of claim 8, further comprising:

an embedded media terminal adapter; and wherein at least some of the each switch of the switch settings applies to settings of the embedded media terminal adapter.

11. A method for configuring a customer equipment in a communication network, comprising:

embedding an operating software load in a machine-readable media of the customer equipment;

the operating software load comprising switch settings each controlling a predetermined group of device settings for compatible operation between the customer equipment and equipment of the communication network, wherein the predetermined group of device settings are associated with one or more features;

each switch of the switch settings turning the predetermined group of device settings on or off based on whether the one or more features associated with the predetermined group of devices are compatible with the equipment of the communication network, each of the predetermined group of device settings comprising a plurality of settings which either are or are not implemented by a particular type of the equipment of the communication network;

operating a configuration server device to adapt a configuration file with settings for the switches of the operating software load of the customer equipment; and the operating software load adapted to apply the settings for the switches of the operating software load of the customer equipment to set the each switch of the switch settings on or off.

12. The method of claim 11 wherein the switch settings of the operating software load control groups of type length values that determine content of messages between the customer equipment and the equipment of the communication network.

13. The method of claim 11 wherein the customer equipment provisions the customer equipment responsive to at least one of the settings for the switches of the operating software load of the customer equipment.

14. The method of claim 11, wherein the configuration server device implements a trivial file transfer protocol server.

15. The method of claim 11, wherein the customer equipment implements an embedded media terminal adapter.

16. The method of claim 11, wherein the configuration server device comprises a packetCable provisioning server.

17. The method of claim 11, wherein the configuration server device comprises a packetCable call management server.

* * * * *